United States Patent
Gadiyar et al.

(10) Patent No.: US 10,127,594 B2
(45) Date of Patent: Nov. 13, 2018

(54) COMPUTING DEVICE FOR CUSTOM GOLF CLUB FITTING

(71) Applicant: PayPal, Inc., San Jose, CA (US)

(72) Inventors: Vivek Gadiyar, San Jose, CA (US); Jogender Singh, Fremont, CA (US); Oleg Zenzin, Sausalito, CA (US)

(73) Assignee: PAYPAL, INC., San Jose, CA (US)

( * ) Notice: Subject to any disclaimer, the term of this patent is extended or adjusted under 35 U.S.C. 154(b) by 1228 days.

(21) Appl. No.: 14/066,257

(22) Filed: Oct. 29, 2013

(65) Prior Publication Data
US 2014/0058900 A1 Feb. 27, 2014

Related U.S. Application Data

(63) Continuation of application No. 13/327,515, filed on Dec. 15, 2011, now Pat. No. 8,579,731.

(51) Int. Cl.
| | | |
|---|---|---|
| *G06Q 30/00* | (2012.01) | |
| *G06Q 30/06* | (2012.01) | |
| *A63B 57/00* | (2015.01) | |
| *G01B 11/02* | (2006.01) | |

(52) U.S. Cl.
CPC ......... *G06Q 30/0627* (2013.01); *A63B 57/00* (2013.01); *G06Q 30/0641* (2013.01); *G01B 11/02* (2013.01)

(58) Field of Classification Search
CPC .................................................. G06Q 30/00
See application file for complete search history.

(56) References Cited

U.S. PATENT DOCUMENTS

| | | | |
|---|---|---|---|
| 3,576,537 A | | 4/1971 | Ernst |
| 4,102,049 A | * | 7/1978 | Harth ....................... G01B 3/02 33/1 B |
| 7,799,366 B2 | | 9/2010 | Kuiken et al. |
| 8,579,731 B2 | | 11/2013 | Gadiyar et al. |
| 2002/0138170 A1 | | 9/2002 | Onyshkevych et al. |
| 2003/0056384 A1 | | 3/2003 | Masley |
| 2010/0151956 A1 | | 6/2010 | Swartz et al. |
| 2011/0055054 A1 | * | 3/2011 | Glasson ................. G06Q 30/06 705/27.2 |

(Continued)

FOREIGN PATENT DOCUMENTS

WO     WO-0043936 A2     7/2000

OTHER PUBLICATIONS

"U.S. Appl. No. 13/327,515, Notice of Allowance dated Jul. 10, 2013", 9 pgs.

(Continued)

*Primary Examiner* — James S McClellan
(74) *Attorney, Agent, or Firm* — Maschoff Brennan

(57) ABSTRACT

In an example embodiment, a method is provided using a computing device that has a sensor for custom golf club fitting. Here, a hand dimension is detected using the sensor of the computing device. The hand dimension correlates to a grip size of a golf club. A query is composed with a parameter based on the detected hand dimension. The query is then communicated to an online platform that facilitates sales of golf clubs. In response to the query, an inventory of a number of the golf clubs having the grip size is received from the online platform.
The inventory is then provided for display on the computing device.

15 Claims, 10 Drawing Sheets

(56) References Cited

U.S. PATENT DOCUMENTS

2013/0159141 A1    6/2013  Gadiyar et al.

OTHER PUBLICATIONS

"U.S. Appl. No. 13/327,515, Response filed Jun. 4, 2013 to Restriction Requirement dated May 16, 2013", 8 pgs.
"U.S. Appl. No. 13/327,515, Restriction Requirement dated May 16, 2013", 6 pgs.
"Custome Club Fitting by Smartfit", [Online]. Retrieved from the Internet: <URL: http://www.golfsmith.com/customclub#top>. (Accessed Aug. 3, 2011), 1 pg.
"GeoPlay Golf", [Online]. Retrieved from the Internet: <URL: http://geoplaygolf.com/>, (Accessed Aug. 3, 2011), 3 pgs.
"iGolf Mobile—Golf GPS", [Online]. Retrieved from the Internet: <URL: http://itunes.apple.com/us/app/igolf-mobile-golf-gps/id342537812?mt=8>, (Accessed Aug. 3, 2011), 3 pgs.
"iSwingSpeedv1", [Online]. Retrieved from the Internet: <URL: http://itunes.apple.com/us/app/iswingspeedv1/id393818506?mt=8>, (Accessed Aug. 3, 2011), 2 pgs.

\* cited by examiner

COMPUTING DEVICE FOR CUSTOM GOLF CLUB FITTING

CROSS-REFERENCE TO RELATED APPLICATIONS

This application is a continuation of U.S. application Ser. No. 13/327,515 filed Dec. 15, 2011, which application is incorporated in its entirety herein by reference.

FIELD

The present disclosure relates generally to golf club fitting. In an example embodiment, the disclosure relates to a computing device for custom golf club fitting.

BACKGROUND

Currently, there are many applications that locate appropriate sized golf clubs to match a user's unique traits. Typically, a user interfaces with such an application to input various information, such as his height, his glove size, his gender, his hand preference, his assessment of his game, and other information. The application then uses the inputted information to find or recommend one or more golf clubs that fit the user's individual needs.

However, some or all information manually inputted by the user is inaccurate because the information is estimated by the user. That is, the user typically does not have the means to measure a particular parameter at the time when inputting such information into the application, and therefore, the user basically provides an estimate of the requested information. For example, a user typically does not have a ruler or other instrument to measure his hand size and thus, the user can only provide an estimate of his glove size. The problem with providing inaccurate information is that the golf clubs identified by conventional applications may not be a good fit to the user's individual needs.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

Figure 1:
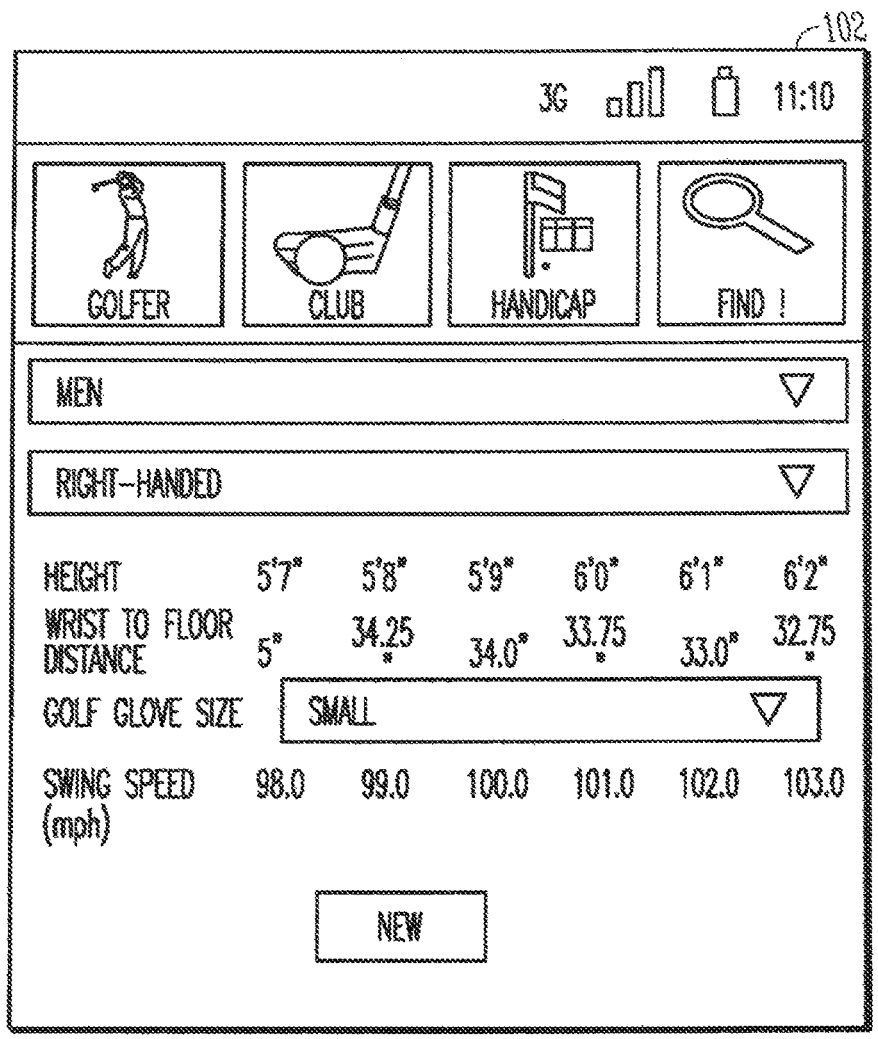
FIG. 1 is an interface diagram showing an example embodiment of a graphical user interface displayed by an application, as executed on a mobile computing device, for custom golf club fittings.

FIG. 1 is an example embodiment of a GUI 102 displayed by an application, as executed on a mobile computing device, for custom golf club fittings. As depicted, the GUI 102 shows various parameters that can be entered by a user. For example, the application can take input of parameters such as height, wrist to floor distance, golf glove size, and swing speed. Using these parameters, the application is able to search for inventories of golf clubs that satisfy or fit these parameters.

Example embodiments can automatically detect, using sensors of the mobile computing device, one or more parameters, such as the golf glove size. For example, as explained in more detail below, the mobile computing device can detect a hand dimension using a sensor. This detected hand dimension correlates to a grip size of the golf club, and the application communicates this hand dimension, along with other parameters, to an online platform that facilitates sales of golf clubs. The online platform then searches its inventory for all golf clubs that satisfy the parameters provided by the application, and then communicates to the application an inventory of golf clubs that have a matching grip size and/or other matching parameters.

The application, as executed on the mobile computing device, then displays the inventory communicated from the online platform. From the mobile device, a user can then shop for one or more golf clubs by browsing through the inventory.

Figure 2:
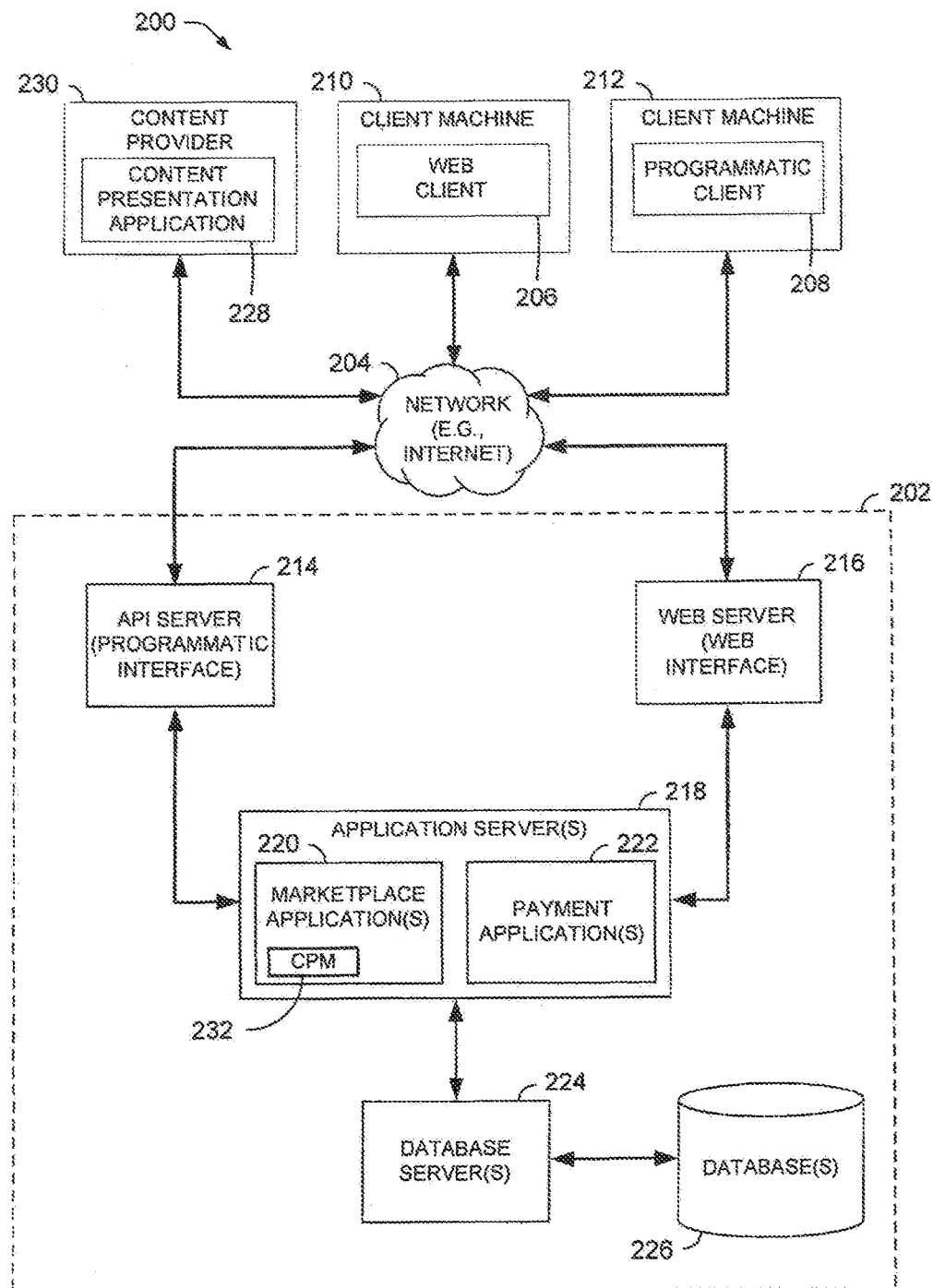
FIG. 2 is a block diagram of a client-server system within which an example embodiment may be deployed.

FIG. 2 is a block diagram of a client-server system 200 within which an example embodiment may be deployed. An online platform 202, in the example form of a network-based marketplace or publication system, provides server-side functionality via a network 204 (e.g., the Internet or Wide Area Network (WAN)) to one or more clients 210 and 212 in the form of mobile computing devices. FIG. 2 illustrates, for example, a web client 206 (e.g., a browser, such as the INTERNET EXPLORER browser developed by MICRO- SOFT CORPORATION of Redmond, Wash.) executing on client 210, and a programmatic client 208 executing on respective client 212.

In the online platform 202, an Application Programming Interface (API) server 214 and a web server 216 are coupled to, and provide programmatic and web interfaces respectively to, one or more application servers 218. Application servers 218 are commerce servers that can host, for example, one or more marketplace applications 220 and payment applications 222. Application servers 218 are, in turn, shown to be coupled to one or more servers 224 that facilitate access to one or more databases 226.

Marketplace applications 220 may provide a number of marketplace functions and services to users that access the online platform 202. Payment applications 222 may likewise provide a number of payment services and functions to users. Payment applications 222 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 220. While the marketplace and payment applications 220 and 222 are shown in FIG. 2 to both form part of the online platform 202, it will be appreciated that, in alternative embodiments, payment applications 222 may form part of a payment service that is separate and distinct from the online platform 202.

Further, while the system 200 shown in FIG. 2 employs a client-server architecture, the present invention is not limited to such an architecture, and could equally well find application in a distributed, or peer-to-peer, architecture system, for example. The various marketplace and payment applications 220 and 222 could also be implemented as standalone software programs, which do not necessarily have networking capabilities.

The Web client 206 accesses the various marketplace and payment applications 220 and 222 via the web interface supported by web server 216. Similarly, programmatic client 208 accesses the various services and functions provided by the marketplace and payment applications 220 and 222 via the programmatic interface provided by API server 214. Programmatic client 208 may, for example, be a seller application (e.g., the TURBOLISTER application developed by EBAY INC., of San Jose, Calif.) to enable sellers to author and manage listings on online platform 202 in an off-line manner, and to perform batch-mode communications between programmatic client 208 and online platform 202. Some embodiments of the present invention may be implemented by components of the marketplace application (s) 220. For example, a content provider manager 232 or other system may perform the marketplace listing management functions and activities described herein.

FIG. 2 also illustrates a third party content presentation application 228, executing on a third party content provider server machine 230, as having programmatic access to networked system 202 via the programmatic interface provided by API server 214. For example, third party content presentation application 228 may, utilizing information retrieved from networked system 202, support one or more features or functions on a website hosted by the third party content provider. The third party content provider website may, for example, present content that includes one or more indicators associated with one or more marketplace listings maintained within networked system 202.

Figure 3:
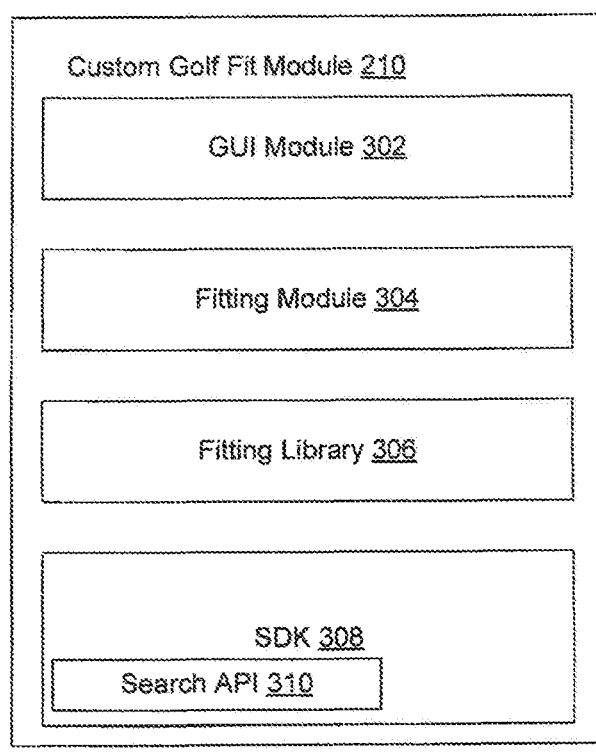
FIG. 3 is a block diagram of a custom golf fit module, in accordance with an embodiment of the present invention.

FIG. 3 is a block diagram of a custom golf fit module 312, in accordance with an embodiment of the present invention. This custom golf fit module 312 can be hardware included in, or can be part of an application as executed on a computing device, such as a mobile computing device. It should be noted that a "mobile computing device," as used herein, refers to a small or pocket-sized computing device that includes a system battery that is used to power the mobile computing device. Examples of mobile processing systems include a mobile phone (e.g., smart phone), a personal digital assistant (PDA), and a laptop computer.

In one embodiment, the custom golf fit module 312 is configured to communicate with an online platform, such as the online platform 202 depicted in FIG. 2. In various embodiments, the custom golf fit module 312 may be used to implement computer programs, logic, applications, methods, processes, or software to automatically detect parameters (e.g., hand dimensions of a user) for custom golf club fittings.

As depicted in FIG. 3, the custom golf fit module 312 includes a GUI module 302, a fitting module 304, a fitting library 306, and a software development kit (SDK) 308. The fitting module 304 is configured to detect one or more parameters. For example, as explained in more detail below, the fitting module 304 can activate various sensors, such as a camera or an accelerometer included in a mobile computing device, to detect various hand dimensions. The fitting module 304 can then communicate the parameters to an online platform through, for example, the SDK 308. In one embodiment, the SDK 308 includes a search API 310. In general, the search API 310 enables access to various functionalities related to searching, which may be provided by the online platform or a search engine. For example, through the search API 310, calls can be made to search for items by category, description, and product information.

The GUI module 302 is configured to generate the GUIs for display at the mobile computing device. As also explained in more detail below, the fitting library 306 is configured to store various information used for parameter conversions. For example, the fitting library 306 can include or store a conversion table that correlates hand dimensions to grip sizes. In another example, the fitting library 306 can store a different conversion table that correlates hand dimensions to glove sizes.

It should be appreciated that in other embodiments, the custom golf fit module 312 may include fewer or more modules apart from those shown in FIG. 3. For example, in an alternate embodiment, the fitting library 306 can be integrated within the fitting module 304. The modules 302, 304, 306, and 308 may be in the form of software that is processed by a processor. In another example, as explained in more detail below, the modules 302, 304, and 306 may be in the form of firmware that is processed by Application-Specific Integrated Circuits (ASICs), which may be integrated into a circuit board of a mobile computing device. Alternatively, the modules 302, 304, and 306 may be in the form of one or more logic blocks included in a programmable logic device (e.g., a field programmable gate array (FPGA)). The described modules 302, 304, 306, and 308 may be adapted, and/or additional structures may be provided, to provide alternative or additional functionalities beyond those specifically discussed in reference to FIG. 3. Examples of such alternatives or additional functionalities will be discussed in reference to the flow diagrams discussed below.

Figure 4:
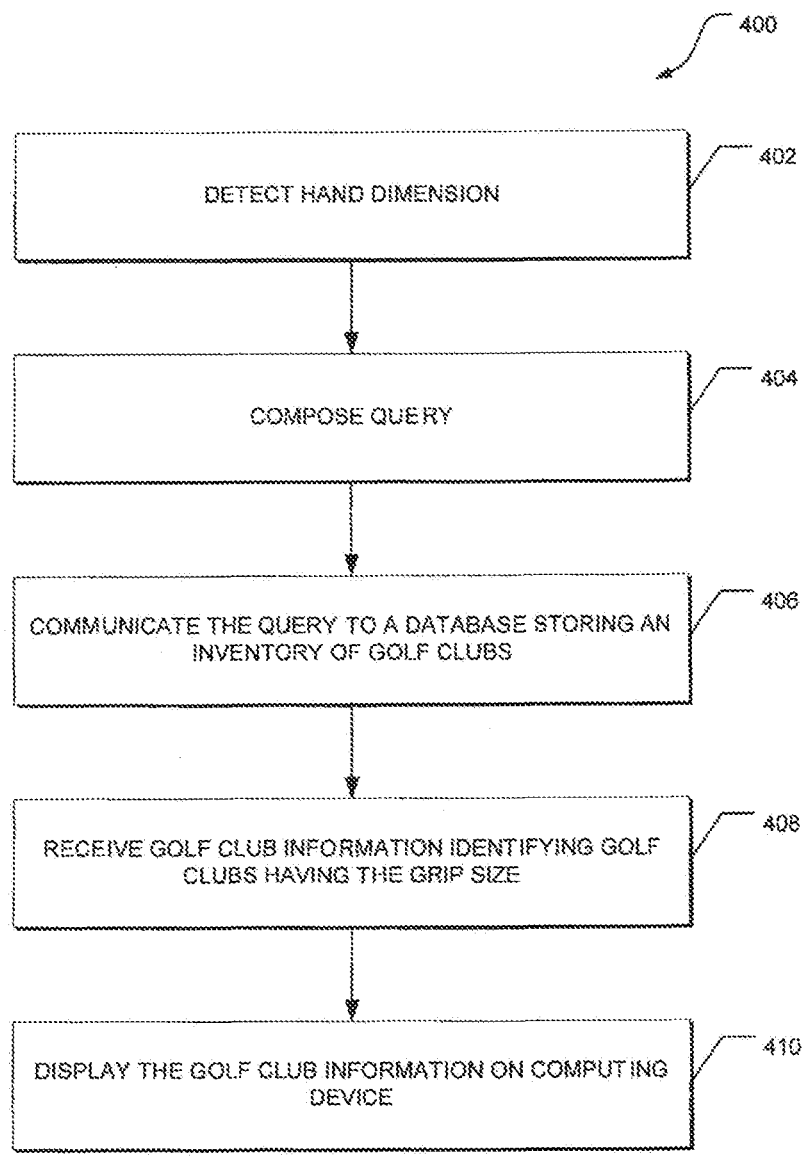
FIG. 4 is a flow diagram of a general overview of a method, in accordance with an embodiment, for providing an inventory of golf clubs based on a custom golf club fitting.

FIG. 4 is a flow diagram of a general overview of a method 400, in accordance with an embodiment, for providing an inventory of golf clubs based on a custom golf club fitting. In an example embodiment, the method 400 may be implemented by, for example, the custom golf fit module 312 depicted in FIG. 3. As depicted in FIG. 4, a fitting module, at 402, detects one or more hand dimensions using a sensor of a computing device. In one example, the hand dimension is a distance from a main crease under a base of a wrist to a tip of a longest finger on a hand. In another example, the hand dimension is a length of a longest finger on the hand. In one embodiment, a camera of the mobile computing device can be used to detect the hand dimensions. In an alternate embodiment, an accelerometer and clock included in the mobile computing device can be used.

The fitting module then composes or creates a query based on the detected hand dimension, at 404. A "query," as used herein, is an enquiry about one or more items, which include any tangible or intangible thing and/or something that has a distinct, separate existence from other things (e.g., goods and services). The terms included in the query can include words, numbers, symbols, and other alphanumeric characters. The query can be submitted to an online platform to locate, purchase, or bid on one or more items. In one embodiment, the query includes the detected hand dimension itself. In another embodiment, the query includes a grip size. To calculate or determine the grip size, the fitting module accesses a conversion table, which is stored in the fitting library, which is used to convert hand dimensions to grip sizes. In another embodiment, the query is a glove size. Here, the fitting module accesses a different conversion table that is used to convert hand dimensions to glove sizes.

Thereafter, the query is communicated, at 406, to one or more databases storing an inventory of golf clubs. Such a communication can be through a search API. In one embodiment, the databases can be included in an online platform that facilitates sales of golf clubs. In response to the query, at 408, the fitting module, through the search API, receives golf club information from the database identifying golf clubs having the grip size. For example, the fitting module can receive an inventory of a number of golf clubs from the online platform that have a particular grip size that correlates to the detected hand dimension. The graphical user interface module then, at 410, provides the golf club information for display on the mobile computing device. A user can then view the inventory and select one or more golf clubs for purchase.

Figure 5:
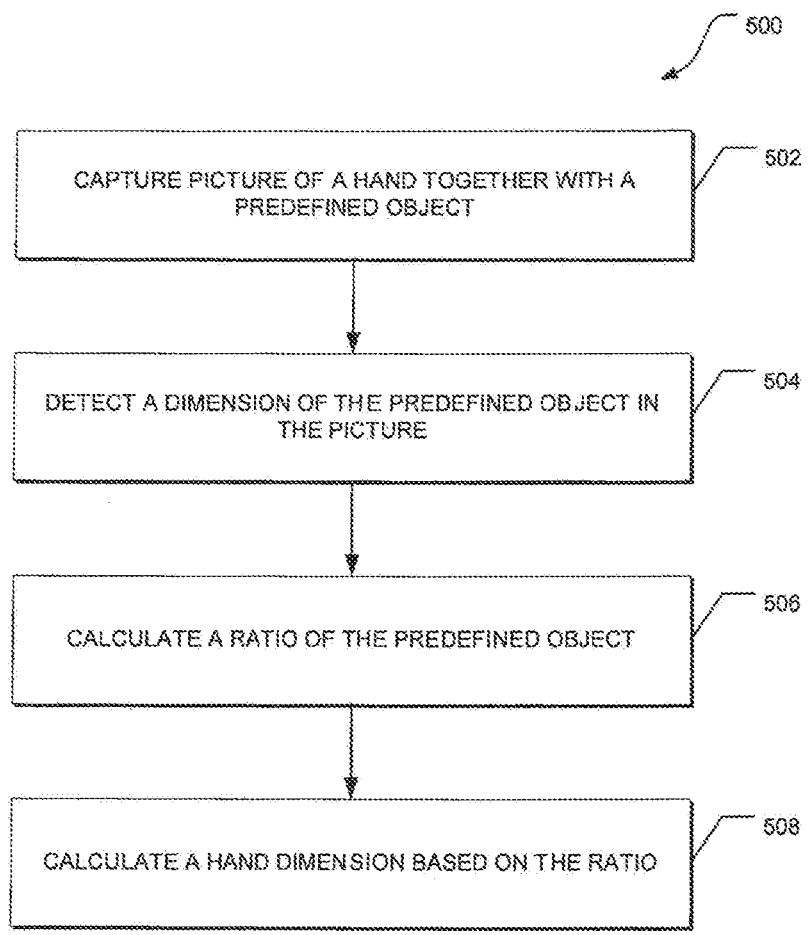
FIG. 5 is a flow diagram of a detailed method, in accordance with an example embodiment, for detecting a hand dimension using a camera included in a computing device.

FIG. 5 is a flow diagram of a detailed method 500, in accordance with an example embodiment, for detecting a hand dimension using a camera included in a computing device. In an example embodiment, the method 500 may be implemented by the custom golf fit module 312 depicted in FIG. 3. As depicted in FIG. 5, at 502, a fitting module captures, with use of a camera included in a computing device, a picture of a hand together with a predefined object. As used herein, a "predefined object" refers to an object that has a standard or known dimension. Examples of predefined objects include coins and sheets of paper that have standard dimensions (e.g., letter size, A4, and legal size). The standard dimensions are stored in, for example, the fitting library of the custom golf fit module. The custom golf fit module can communicate to a user the particular predefined object to use before the picture is captured.

The fitting module then, at 504, detects a dimension of the predefined object in the picture. It should be appreciated that a variety of different techniques can be used to detect the dimension. For example, the fitting module can use an algorithm to identify an outline of the predefined object and, based on the outline, measure a dimension of the predefined object in the picture. At 506, the fitting module calculates a ratio of the predefined object based on the detected dimension and the standard dimension of the predefined object. As explained in more detail below, the hand dimension can then be calculated, at 508, based on this ratio.

Figure 6:
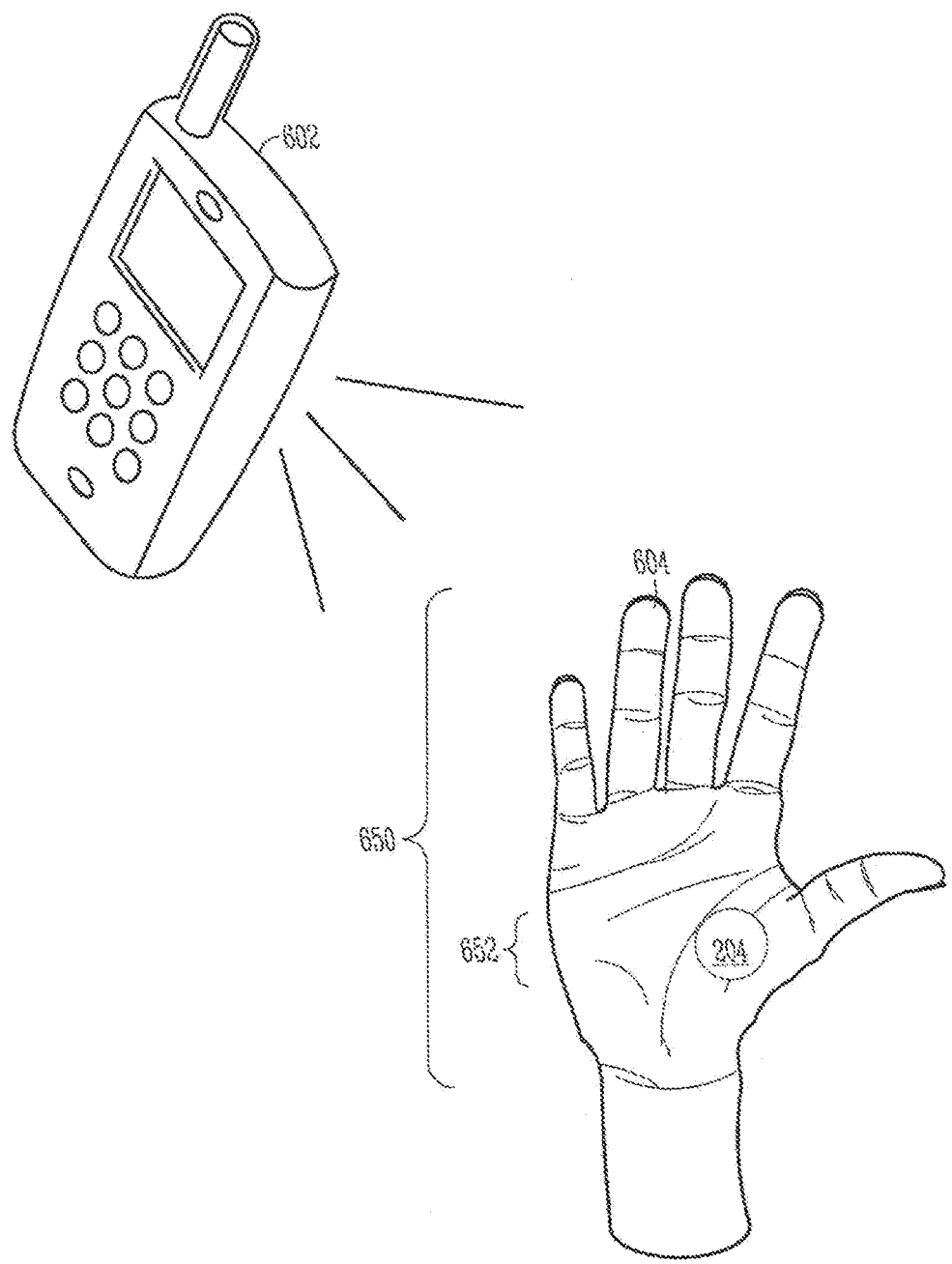
FIG. 6 is a diagram illustrating the detection of a hand dimension using a camera on a mobile computing device, in accordance with an example embodiment of the present invention.

FIG. 6 is a diagram illustrating the detection of a hand dimension using a camera on a mobile computing device, in accordance with an example embodiment of the present invention. As depicted, a user places his hand 604 along with a coin 204 proximate to a mobile computing device 602, which is a smart phone. Using the mobile computing device 602, the user takes a picture of his hand 604 with reference to the coin 204, and this picture is stored in the mobile computing device 602. The custom golf fit module then accesses this picture and analyzes it to detect a dimension 652 of the coin 204 (e.g., diameter of the coin 204). For example, the custom golf fit module detects an outline of the coin 204 and uses the detected outline to measure a dimension of the coin 204. A ratio based on the detected dimension and a standard dimension, which is predefined, can be calculated.

Additionally, the custom golf fit module can detect hand dimension 650. For example, the custom golf fit module can also detect various features and outlines of the hand 604, and use these features and outlines for reference to measure hand dimension 650, which is a distance from a main crease under a base of a wrist to a tip of the longest finger on the hand 604.

From these two detected dimensions 650 and 652, the actual hand dimension 650 can be identified or detected. For example, the actual hand distance can be calculated using the following equation:

$$\text{Actual Hand Dimension} = \text{Detected Hand Dimension} * \text{Ratio}$$

where the Ratio is the detected object dimension/standard object dimension, as discussed above.

In an alternate embodiment, instead of providing the flexibility to have the user place his hand 604 anywhere in the proximity of the mobile computing device 602, the mobile computing device 602 can display a viewfinder of the camera with predefined marks indicating a position and distance to place the predefined object (along with the hand 604) relative to the camera. For example, the mobile computing device 602 can display a viewfinder with two parallel lines indicating where the outer diameter of the coin 204 should be placed. The user, when viewing through the viewfinder, places his hand with the coin 204 such that the edges of the coin 204 touch the two lines. Given that the two lines are predefined, the ratio of the coin 204 is already known and therefore, the hand dimension 650 can be quickly detected or measured without an additional calculation of the ratio of the coin 204.

Figure 7:
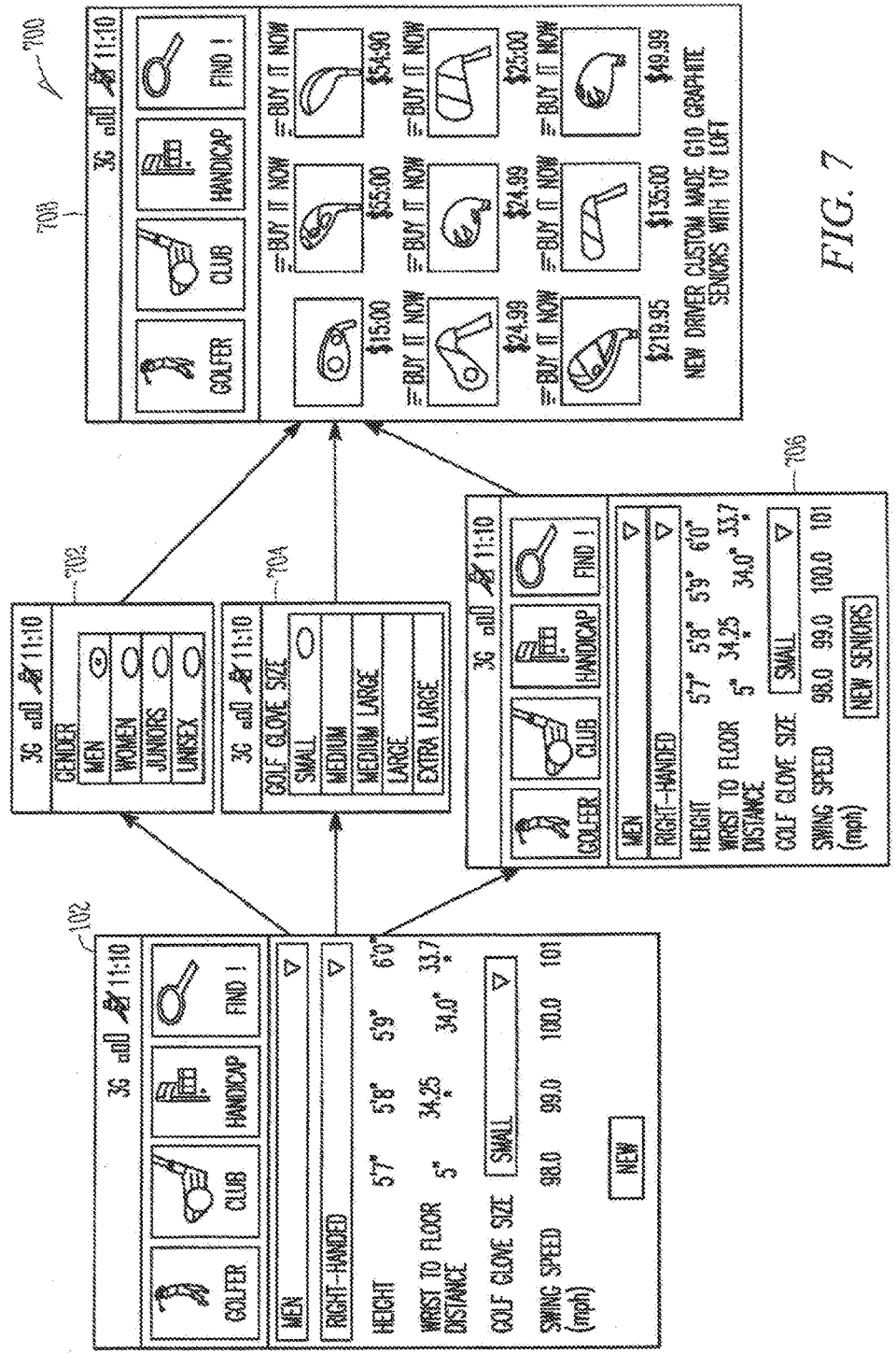
FIG. 7 is an interface diagram depicting various graphical user interfaces (GUIs) that lead to the display of an inventory of golf clubs for purchase based on a custom golf club fitting using a computing device.

FIG. 7 depicts various GUIs 102, 702, 704, and 708 that lead to the display of an inventory of golf clubs for purchase based on a custom golf club fitting using a computing device. As depicted, the various displays 700 include GUIs 102, 702, 704, and 708. In GUI 102, the user can input various parameters associated with the selection of one or more customized golf clubs. As discussed previously, the GUI 102 allows the user to input his height, wrist to floor distance, golf glove size, and swing speed. In one embodiment, as discussed above, the custom golf fit module can automatically detect a hand dimension of the user and convert the detected hand dimension to a golf glove size. The user uses the various user interfaces 102, 702, and 704 to input the parameters. For example, the user can use GUI 702 to indicate his gender. The custom golf fit module can also automatically select the user's golf glove size, as depicted in GUI 704, in accordance with the techniques discussed herein.

The custom golf fit module then composes a query with all the parameters (e.g., gender, height, wrist to floor distance, golf glove size, and swing speed) and communicates the query to an online platform. In response to the query, the custom golf fit module receives an inventory from an online platform listing all the golf clubs that satisfy the query. As depicted in FIG. 7, the custom golf fit module then provides the inventory for display, in the form of GUI 708 listing and showing pictures of the golf clubs and their prices that have been determined to be a custom fit for the user. Through use of the GUI 708, a user can browse the inventory of golf clubs and initiate a purchase of one or more of the listed golf clubs.

Figure 8:
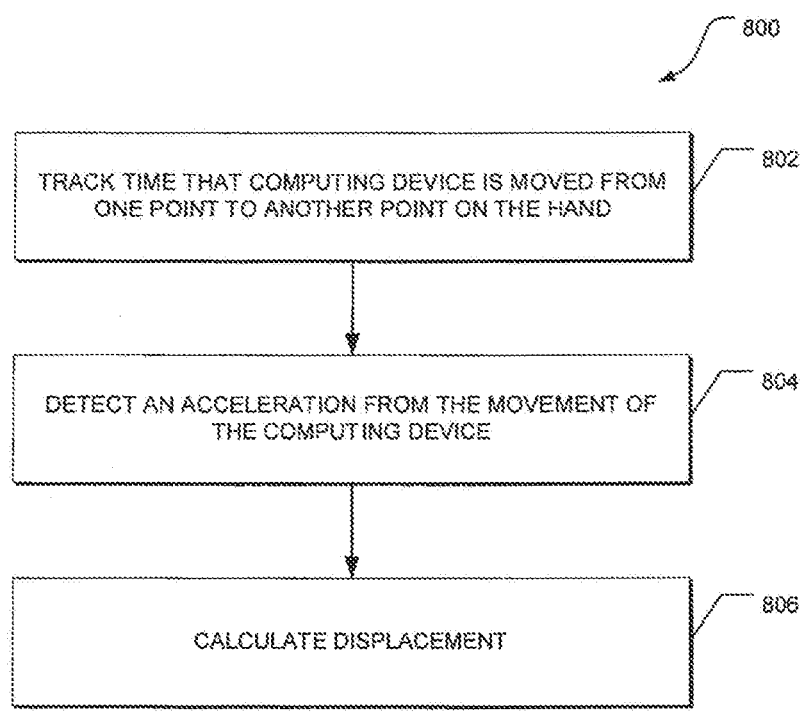
FIG. 8 is a flow diagram of a detailed method, in accordance with an alternate embodiment, for detecting a hand dimension using an accelerometer included in a computing device.

FIG. 8 is a flow diagram of a detailed method 800, in accordance with an alternate embodiment, for detecting a hand dimension using an accelerometer included in a computing device. In an example embodiment, the method 800 may be implemented by, for example, the custom golf fit module 312 depicted in FIG. 3. Referring to FIG. 8, the fitting module, at 802, uses a clock to track a time that a computing device is moved from one point on the hand to another point on the same hand. The distance between the two points is the hand dimension that is being measured or detected. At the same time, the fitting module uses an accelerometer on the computing device to detect an acceleration of the mobile computing device when moved from the first point to the second point, at 804. With the time and acceleration detected, the fitting module can calculate a displacement, at 806, where the displacement is effectively the hand dimension being measured.

Figure 9:
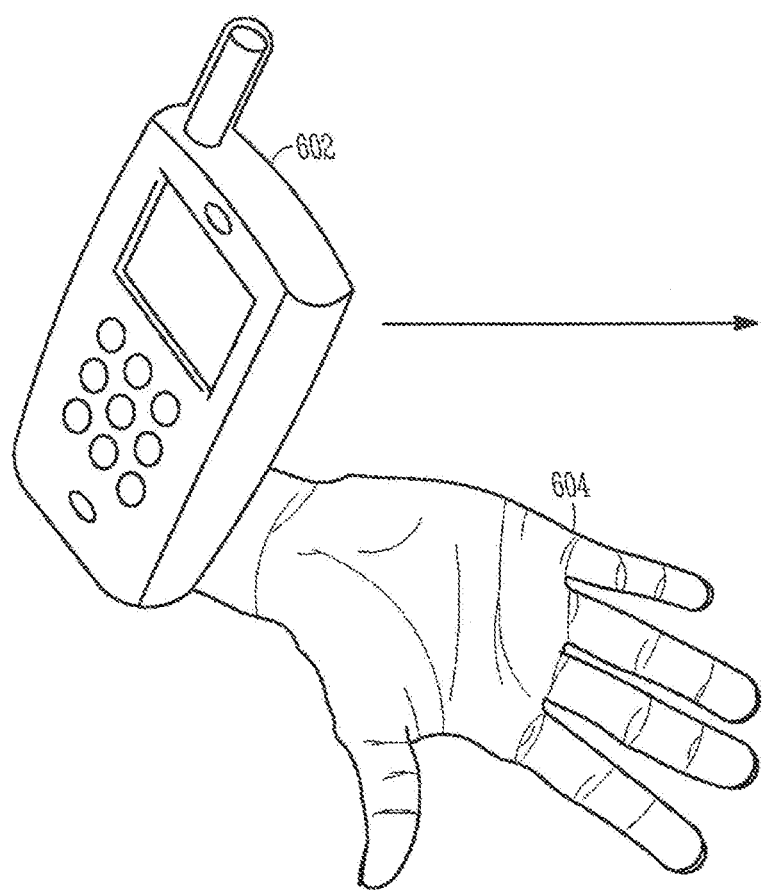
FIG. 9 is a diagram depicting the detection of a hand dimension using an accelerometer included in a mobile phone, in accordance with an alternate embodiment of the present invention.

FIG. 9 is a diagram depicting the detection of a hand dimension using an accelerometer included in a mobile phone, in accordance with an alternate embodiment of the present invention. As depicted, a user places his hand 604 proximate to a mobile computing device 602, which is a smart phone. In this example, the user wants to measure a distance from a main crease under a base of a wrist to a tip of a longest finger on the hand 604. To detect this hand dimension, the custom golf fit module prompts the user to place his smartphone at the first point to be measured and then makes another prompt for the user to move his smartphone to a second point. In this example, the user first places the mobile computing device 602 at a point located at the main crease under a base of a wrist and then, as illustrated, the user moves the mobile computing device 602 from left to right to end at a point located at a tip of the longest finger on the hand 604.

During the movement, the mobile computing device 602 tracks a time to move from the first point to the second point, and also detects the acceleration during this time. With these two variables identified (time and acceleration), the fitting module can then use, for example, the following equation to calculate a displacement, which correlates to the hand dimension:

$$\Delta x = \int_0^t \left[ \int_0^{t'} a_x(t'') dt'' \right] dt'$$

Wherein $a_x$ is the detected acceleration, t is the tracked time, and $\Delta x$ is the displacement.

The custom golf fit module can then prompt the user to measure another hand dimension, such as a length of a longest finger of the hand using the techniques described above. With these two hand dimensions detected, the custom golf fit module can convert them into a glove size or directly convert them to a grip size by looking up the corresponding glove size or grip size, respectively, using the appropriate conversion chart.

As a result, when compared to conventional applications where a user estimates his glove size, embodiments of the present invention may possibly provide more convenient and accurate methodologies to provide custom golf club fittings, such as the automatic determination of a grip size.

Figure 10:
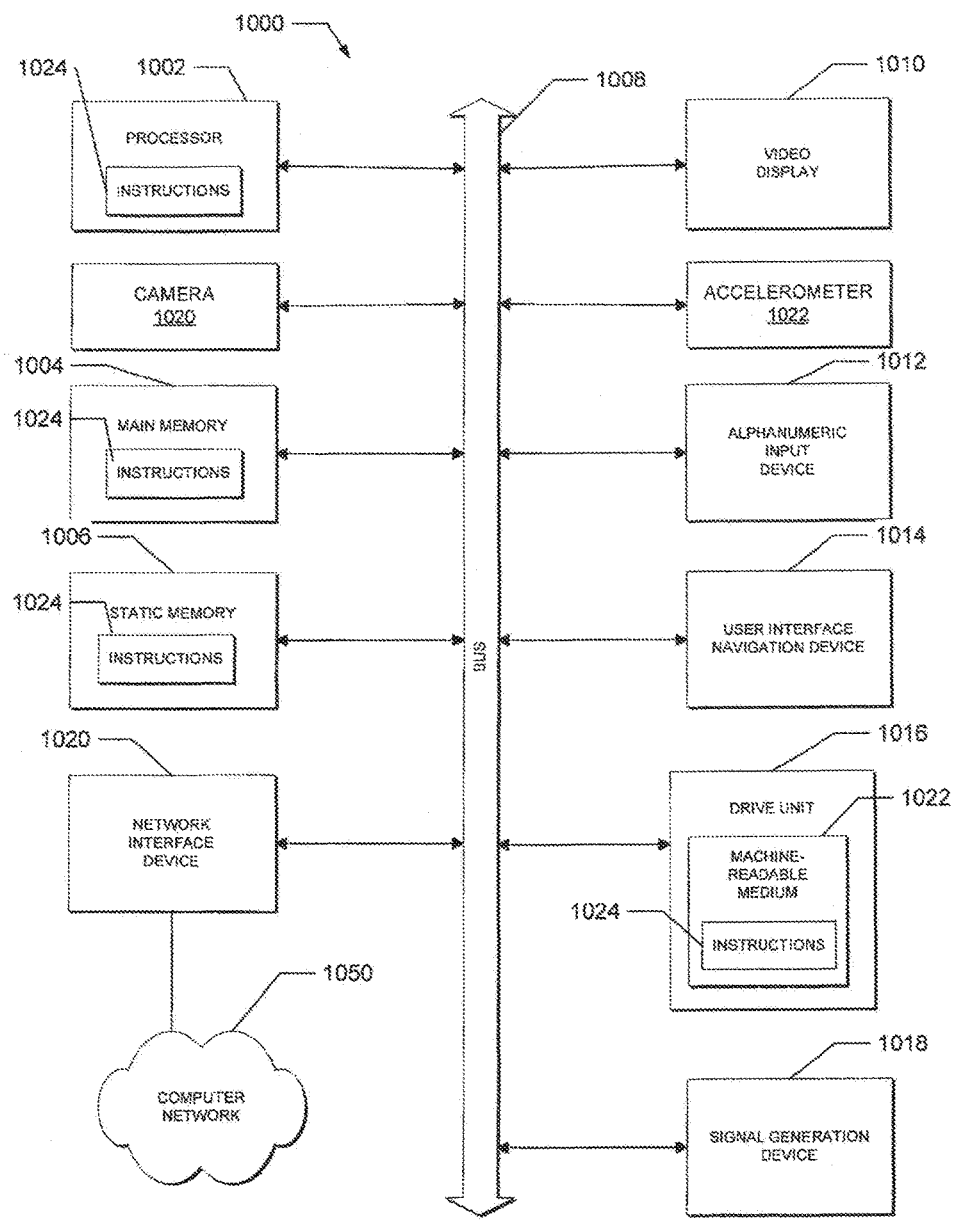
FIG. 10 is a block diagram of a machine in the example form of a computing device within which may be executed a set of instructions for causing the machine to perform any one or more of the methodologies discussed herein.

FIG. 10 is a block diagram of a machine in the example form of a computing device 1000 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the computing device 1000 includes a processor 1002 (e.g., a central processing unit (CPU), a graphics processing unit (GPU) or both), a main memory 1004 (e.g., random access memory), and static memory 1006 (e.g., static random-access memory), which communicate with each other via bus 1008. The computing device 1000 may further include video display unit 1010 (e.g., a liquid crystal display (LCD)), a camera 1020, an accelerometer 1022, an alphanumeric input device 1012 (e.g., a keyboard), a user interface (UI) navigation device 1014, a disk drive unit 1016, a signal generation device 1018 (e.g., a speaker), and a network interface device 1020.

The disk drive unit 1016 (a type of non-volatile memory storage) includes a machine-readable medium 1022 on which is stored one or more sets of data structures and instructions 1024 (e.g., software) embodying or utilized by any one or more of the methodologies or functions described herein. The data structures and instructions 1024 may also reside, completely or at least partially, within the main memory 1004 and/or within the processor 1002 during execution thereof by computing device 1000, with the main memory 1004 and processor 1002 also constituting machine-readable, tangible media.

The data structures and instructions 1024 may further be transmitted or received over a computer network 1050 via network interface device 1020 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the computing device 1000) or one or more hardware modules of a computer system (e.g., a processor 1002 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a FPGA or an ASIC) to perform certain operations. A hardware module may also comprise programmable logic or circuitry (e.g., as encompassed within a general-purpose processor 1002 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 1002 configured using software, the general-purpose processor 1002 may be configured as respective different hardware modules at different times. Software may accordingly configure a processor 1002, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 1002 that are temporarily configured (e.g., by software) or permanently configured to perform the relevant operations. Whether temporarily or permanently configured, such processors 1002 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 1002 or processor-implemented modules.

The performance of certain of the operations may be distributed among the one or more processors 1002, not only residing within a single machine, but deployed across a number of machines. In some example embodiments, the processors 1002 may be located in a single location (e.g., within a home environment, an office environment or as a server farm), while in other embodiments the processors 1002 may be distributed across a number of locations.

While the embodiment(s) is (are) described with reference to various implementations and exploitations, it will be understood that these embodiments are illustrative and that the scope of the embodiment(s) is not limited to them. In general, techniques for custom golf club fittings may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment (s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

What is claimed is:

1. A method comprising:
   detecting a body part measurement using an accelerometer of a computing device, the body part measurement correlating to a size of an item and the detection of the body part measurement comprising:
   detecting, by the accelerometer, acceleration of the computing device as the computing device moves from a first position on a user's body to a second position on the user's body;
   determining a distance from the first position to the second position based on the acceleration of the computing device during the movement from the first position to the second position and based on an amount of time that passes during the movement from the first position to the second position; and
   determining the body part measurement based on the distance;
   composing a query with a parameter based on the detected body part measurement;
   communicating the query to an online platform that includes a database storing an inventory of items;
   in response to the query, receiving from the online platform, item information identifying a plurality items having the size; and
   providing the item information for display on the computing device.

2. The method of claim 1, wherein the parameter is the detected body part measurement.

3. The method of claim 1, further comprising:
   accessing a conversion table that correlates body part measurements to item sizes; and
   identifying, using the conversion table, the size that correlates to the detected body part measurement; and
   wherein the parameter is the size.

4. The method of claim 1, wherein the body part measurement is a length of a longest finger on a hand.

5. The method of claim 1, wherein the database is included in an online platform that facilitates sales of the items.

6. The method of claim 1, wherein the detection of the body part measurement further comprises:
instructing the user to place the computing device at the first position and then to move the computing device to the second position.

7. A non-transitory, machine-readable medium that stores instructions, which, in response to being executed by one or more processors, cause a system to perform operations comprising:
detecting a body part measurement using an accelerometer of a computing device, the body part measurement correlating to a size of an item and being determined based on acceleration of the computing device, as detected by the accelerometer, during a time period;
composing a query with a parameter based on the detected body part measurement;
communicating the query to an online platform that facilitates sales of items;
in response to the query, receiving an inventory, from the online platform, of a number of the items having the size; and
providing the inventory for display on the computing device.

8. The non-transitory, machine-readable medium of claim 7, the operations further comprising:
accessing a conversion table that correlates body part measurements to item sizes; and
identifying, using the conversion table, the size that correlates to the detected body part measurement; and
wherein
the parameter is the size.

9. The non-transitory, machine-readable medium of claim 7, wherein the body part measurement is a length of a longest finger on a hand.

10. The non-transitory, machine-readable medium of claim 7, wherein the detection of the body part measurement comprises:
instructing a user to place the computing device at a first position on the user's body and then to move the computing device to a second position on the user's body, the time period being when the movement from the first position to the second position occurs;
during the time period, detecting the acceleration of the computing device as it moves from the first position to the second position;
determining, based on the acceleration of the computing device during the time period and based on a duration of the time period, a distance traveled by the computing device; and
determining the body part measurement based on the distance traveled.

11. A system comprising:
one or more processors of one or more machines; and
a sensor in communication with at least one processor of the one or more processors; the one or more processors configured to cause performance of operations comprising:
detecting a body part measurement using the sensor, the body part measurement correlating to a size of an item and being determined based on acceleration of a computing device, as detected by the sensor, during a time period;
composing a query with a parameter based on the detected body part measurement;
communicating the query to an online platform that facilitates sales of items through a search application programming interface that is configured to communicate with the online platform; and
in response to the query, receiving an inventory, from the online platform through the search application programming interface, of a number of the items having the size; and
providing the inventory for display on the computing device.

12. The system of claim 11, wherein the parameter is the detected body part measurement.

13. The system of claim 11, the operations further comprising:
accessing a conversion table that correlates body part measurements to item sizes; and
identifying, using the conversion table, the size that correlates to the detected body part measurement; and
wherein
the parameter is the size.

14. The system of claim 11, wherein the database is included in an online platform that facilitates sales of the items.

15. The system of claim 11, wherein the detection of the body part measurement comprises:
instructing a user to place the computing device at a first position on the user's body and then to move the computing device to a second position on the user's body, the time period being when the movement from the first position to the second position occurs;
during the time period, detecting the acceleration of the computing device as it moves from the first position to the second position;
determining a distance traveled by the computing device based on the acceleration of the computing device during the time period and based on a duration of the time period; and
determining the body part measurement based on the distance traveled.

* * * * *